(12) United States Patent
Källstrand et al.

(10) Patent No.: US 11,235,747 B2
(45) Date of Patent: Feb. 1, 2022

(54) METHOD FOR CONTROLLING A STEERING SYSTEM OF A VEHICLE

(71) Applicant: Volvo Truck Corporation, Gothenburg (SE)

(72) Inventors: Björn Källstrand, Gothenburg (SE); Leo Laine, Härryda (SE); Leon Henderson, Gothenburg (SE); Patrick Volz, Heilbronn (DE)

(73) Assignee: VOLVO TRUCK CORPORATION, Gothenburg (SE)

( * ) Notice: Subject to any disclaimer, the term of this patent is extended or adjusted under 35 U.S.C. 154(b) by 62 days.

(21) Appl. No.: 16/755,078

(22) PCT Filed: Oct. 10, 2017

(86) PCT No.: PCT/EP2017/075827
§ 371 (c)(1),
(2) Date: Apr. 9, 2020

(87) PCT Pub. No.: WO2019/072379
PCT Pub. Date: Apr. 18, 2019

(65) Prior Publication Data
US 2020/0290588 A1    Sep. 17, 2020

(51) Int. Cl.
*B60W 10/184* (2012.01)
*B60W 30/045* (2012.01)
(Continued)

(52) U.S. Cl.
CPC ........ *B60W 10/184* (2013.01); *B60W 30/045* (2013.01); *B60W 30/18145* (2013.01); *B60W 50/0097* (2013.01); *B60W 2540/18* (2013.01)

(58) Field of Classification Search
CPC ............ B60W 10/184; B60W 30/045; B60W 30/18145; B60W 50/0097; B60W 2540/18
See application file for complete search history.

(56) References Cited

U.S. PATENT DOCUMENTS

2007/0185638 A1 *  8/2007  Odenthal ............. B60W 40/114
                                                        701/70
2009/0093931 A1    4/2009  Mizutani et al.
(Continued)

FOREIGN PATENT DOCUMENTS

DE    102013011883 A1    1/2015
EP        1886901 A1      2/2008
(Continued)

OTHER PUBLICATIONS

International Search Report and Written Opinion for International Patent Application No. PCT/EP2017/075827, dated Jun. 12, 2018, 12 pages.
(Continued)

*Primary Examiner* — Peter D Nolan
*Assistant Examiner* — Wae L Louie
(74) *Attorney, Agent, or Firm* — Withrow & Terranova, PLLC (57) ABSTRACT

The present invention relates to a method for controlling a steering system of a vehicle (100). The steering system comprises individually controllable wheel torque actuators (103, 105) on a respective left (104) and right (106) steerable wheel of the vehicle, wherein the wheel torque actuators (103, 105) are controlled during a turning maneuver of the vehicle.

17 Claims, 7 Drawing Sheets

(51) Int. Cl.
  *B60W 30/18*  (2012.01)
  *B60W 50/00*  (2006.01)

(56) References Cited

U.S. PATENT DOCUMENTS

| | | | |
|---|---|---|---|
| 2012/0006603 | A1 | 1/2012 | Thomson et al. |
| 2013/0325283 | A1 | 12/2013 | Rylander |
| 2020/0089243 | A1* | 3/2020 | Poeppel .......... B60W 60/00182 |
| 2020/0290588 | A1* | 9/2020 | Kallstrand ............. B62D 9/002 |

FOREIGN PATENT DOCUMENTS

| | | |
|---|---|---|
| JP | 2007015473 A | 1/2007 |
| JP | 2007230527 A | 9/2007 |
| JP | 2013252753 A | 12/2013 |
| JP | 2015074421 A | 4/2015 |
| JP | 2015074425 A | 4/2015 |
| JP | 2017100504 A | 6/2017 |
| WO | 2014013682 A1 | 1/2014 |
| WO | 2017122562 A1 | 7/2017 |

OTHER PUBLICATIONS

International Preliminary Report on Patentability for International Patent Application No. PCT/EP2017/075827, dated Sep. 16, 2019, 14 pages.
Notice of Reasons for Refusal for Japanese Patent Application No. 2020519134, dated Sep. 3, 2021, 19 pages.

* cited by examiner

METHOD FOR CONTROLLING A STEERING SYSTEM OF A VEHICLE

This application is a 35 USC 371 national phase filing of International Application No. PCT/EP2017/075827, filed Oct. 10, 2017, the disclosure of which is incorporated herein by reference in its entirety.

TECHNICAL FIELD

The present invention relates to a method for controlling a steering system of a vehicle. The invention also relates to a corresponding steering system and vehicle. The invention is applicable on vehicles, in particularly low, medium and heavy duty vehicles commonly referred to as trucks. Although the invention will mainly be described in relation to a truck, implementation into other vehicles is conceivable.

BACKGROUND

In the field of vehicle, in particularly low-, medium- and heavy duty vehicles commonly referred to as trucks, there is a continuous development with regards to various control functionalities of the vehicle. In particular, the control functionalities intend to improve the drivability of the vehicle, the comfort for the driver, and the safety during operation.

One control functionality that is generally always under improvement is the steering of the vehicle. There is a continuous development in this particular technical field with regards to autonomous steering systems, steer-by-wire systems, etc. In particular, these types of steering systems primarily use electric actuators to control the vehicle and to follow the road curvature as desired. An autonomous steering system may for example base its steering on detected curvatures ahead of the vehicle. The steer-by-wire system bases its steering on input from either a human operator or an autonomous function.

One problem with steering systems such as the ones described above is that in case of malfunctioning, i.e. if the steering is suddenly not functioning as desired. In such cases, the vehicle may not be able to be steered as desired and the vehicle needs to be towed away or, at best, the vehicle is provided with a so called limp-home-mode functionality for driving with reduced vehicle functionality to a repair shop. Moreover, a malfunctioning steering system increases the risk of traffic accidents, such as e.g. lateral collisions with other vehicles, vehicles going off the road, etc., as the steering system is not functioning as intended.

There is thus a desire to provide a steering system having improved functionalities, in particular with regards to steering and drivability of the vehicle.

SUMMARY

It is an object of the present invention to provide a method for controlling a steering system of a vehicle which at least partially overcomes the above described deficiencies. This is achieved by a method according to claim 1.

According to a first aspect of the present invention, there is provided a method for controlling a steering system of a vehicle, the vehicle comprising a front axle comprising a pair of steerable wheels on a left and right hand side of the front axle, wherein each of the steerable wheels comprises an individually controllable wheel torque actuator, wherein the method comprising the steps of determining a required steering angle for operating the vehicle during a turning maneuver; detecting an actual steering angle during the turning maneuver; determining a difference between the required steering angle and the detected, actual steering angle; determining, for the wheel torque actuators of the steerable wheels, a differential wheel torque required for reducing the difference between the required steering angle and the detected, actual steering angle; and controlling the wheel torque actuators for achieving the differential wheel torque of the steerable wheels.

The wording "front axle" should be construed as a front wheel axle which is arranged as the foremost positioned wheel axle of the vehicle as seen in the longitudinal direction of the vehicle. The left and right hand side should thus be seen in relation to the longitudinal direction of the vehicle.

Furthermore, the wording "wheel torque actuator" should be construed as an actuator arranged to apply and control a torque on the steerable wheels. The torque is thus acting on the rotational axis of the wheels, i.e. in the direction of the rotational axis of the wheels. The wheel torque actuator may either add a torque, i.e. a positive torque, in the form of added propulsion of the wheel, or to apply a torque for reducing the rotational speed of the wheel, i.e. a negative torque, i.e. a drive torque or a brake torque. Hence, the wheel torque actuator may be arranged to increase as well as to reduce the torque acting on the respective wheel. Accordingly, when controlling the wheel torque actuators for achieving the differential wheel torque of the steerable wheels, each of the wheel torque actuators applies an individual torque on its respective wheel. For example, the wheel torque actuator of the steerable wheel on the left hand side may apply a torque of higher amplitude than the wheel torque actuator of the steerable wheel on the right hand side. Naturally, the differential wheel torque may also be achieved by applying a torque onto only one of the wheels on the left or right hand side. According to another example, a positive torque may be applied on one of the steerable wheels while a negative torque is applied on the other one of the steerable wheels. According to an example embodiment, the wheel torque actuator may preferably comprise one of a wheel brake or a wheel propulsion unit, such as e.g. an electric machine or a hydraulic motor.

Still further, the wording "turning maneuver" should be construed as a situation when the vehicle deviates from a straight ahead path. Hence, the turning maneuver may relate to a lane change maneuver of the vehicle, or a turning maneuver of the vehicle caused by the road curvature, etc. The turning maneuver may relate to an upcoming, future turning maneuver or an ongoing turning maneuver detected when operating the vehicle. The determined required steering angle may thus be determined based on a so-called feed-forward approach where the upcoming path is detected, or based on a feedback approach where the determined required steering angle is based on a detected rotation of the steering wheel by the vehicle operator. The latter case is particularly useful for steer-by-wire systems, while the first approach is particularly useful for autonomous vehicles.

The present invention is based on the insight that by evaluating a required steering angle, which is compared to an actual steering angle, the individually controllable wheel torque actuators may be controlled for reducing a difference between the required steering angle and the actual steering angle for operating the vehicle as desired. It has been unexpectedly realized that controlling the wheel torque actuators of the steerable wheels on the front axle provides a satisfactory result in terms of controlling the vehicle to be operated as desired. As will be described further below, taking the scrub radius, as well as the king pin axis angle, the camber, castor and/or inclination angle into account when determining an additional torque required for controlling the vehicle as desired has turned out to provide a relatively high level of accuracy of reducing the difference between the required steering angle and the actual steering angle.

Furthermore, the method described above may beneficially be used as a backup steering system for controlling operation of the vehicle in case of e.g. malfunctioning of the primary steering system, or when the primary steering system is not functioning as desired. Hence, the above described method may also be used as a complement or assistance to the primary steering system.

Still further, and as will be described further below, by controlling the wheel torque actuators to reduce a difference between the required steering angle and the actual steering angle, the vehicle speed may still be maintained as desired. Hereby, the above described method as well as the steering system described below will not have to set the vehicle in the so called limp-home-mode in case the primary system is malfunctioning. Thus, the vehicle may still be operated as desired. Another advantage is that by controlling the steering angle of the wheels, the method is not dependent on determining yaw rate. Hereby, the method is well suited and stable at low vehicle speeds and when operated at large road radii.

According to an example embodiment, the method may further comprise the steps of determining the turning maneuver by determining an upcoming path ahead of the vehicle; and detecting the actual steering angle when the vehicle is operated at the path.

The path ahead of the vehicle should be construed such as to relate to the curvature of the road ahead of the vehicle. The upcoming path may be detected by e.g. a path controller of the vehicle, such as e.g. a path following module connected to suitable path detection sensors, etc.

Hereby, the required steering angle for operating the vehicle at the upcoming path may be determined in advance, i.e. before the vehicle arrives at the road curvature where it may be in need of control.

According to an example embodiment, the step of determining the differential wheel torque may comprise the steps of determining a front wheel lateral force exposed to the pair of front wheels; and determining the differential wheel torque based on the front wheel lateral force.

Hereby, the differential wheel torque may be controlled based on parameters affecting the pair of front wheels. This can further improve the accuracy of operating the vehicle as desired, i.e. to improve the reduction between the required steering angle and the actual steering angle. The lateral forces aim to align the wheels, whereby the front wheel lateral forces may arise due to e.g. the vehicle is turning and/or effects associated with external loads on the vehicle such as e.g. wind loads, road condition, etc.

According to an example embodiment, the step of determining the front wheel lateral force may comprise the steps of determining a slip angle of the steerable wheels for the turning maneuver; and determining the front wheel lateral force based on a cornering stiffness of the steerable wheels and the slip angle.

The slip angle should be construed as an angle defining the difference between angular position of the wheel and the actual angular direction of movement of the wheel. For example, if the steerable wheels are steered 15 degrees relative to a longitudinal axis, but the actual movement of the steerable wheels is 12 degrees relative to the same longitudinal axis, then the slip angle is 3 degrees. The cornering stiffness of the tires on the other hand is the stiffness of the steerable wheels in the lateral direction. The cornering stiffness is a tire parameter defined as a factor between the slip angle (or side slip angle) and lateral tire force. The cornering stiffness may be considered constant for small slip angles, for a given tire at a given normal load.

According to an example embodiment, the step of determining the differential wheel torque may further comprise the steps of determining a required additional steering torque of the front pair of wheels for reducing the difference between the required steering angle and the detected, actual steering angle; and determining the differential wheel torque based on the required additional steering torque and a wheel suspension scrub radius of the steerable wheels.

The scrub radius should be understood as a transversal distance between a position where the king pin axis of the wheel intersects the road surface and a center of a contact patch between the wheel and the road surface. The scrub radius is also commonly referred to as "steering-axis offset at ground".

As described above, the inventors have unexpectedly realized that the scrub radius, and in particular a positive scrub radius can effectively be used when determining the differential wheel torque to be applied. Hereby, the additional steering torque will affect the steerable wheels to move in the desired direction.

According to an example embodiment, the required additional steering torque may be further based on a suspension caster angle of the steerable wheels. Hereby, the accuracy of determining the required additional steering torque may be even further improved, taking account for further parameters of the wheels and how they interconnect to the ground surface during operation.

According to an example embodiment, the method may further comprise the steps of determining a desired longitudinal vehicle force of the vehicle during the turning maneuver; determining a change of the longitudinal vehicle force resulting from the applied differential wheel torque of the steerable wheels; and controlling the vehicle to add propulsion or braking for maintaining the desired longitudinal vehicle force.

An advantage is, as also indicated above, that the vehicle can maintain a desired vehicle speed during the turning maneuver by controlling the longitudinal vehicle force. Thus, in case the steering system is a secondary, redundant steering system, the operability of the vehicle can be maintained and there is no need of controlling the vehicle in a limp-home-mode or the like. Thus, steering can be controlled by controlling the wheel torque actuators of the steerable wheels, while at the same time controlling the vehicle speed.

According to an example embodiment, the vehicle may further comprise at least one rear axle comprising a pair of rear non-steerable wheels on a left and right hand side of the rear axle, wherein each of the rear wheels comprises a rear wheel torque actuator, wherein the method further comprises the step of inhibiting the rear wheel torque actuator on the rear wheels from applying a wheel torque when operating the torque actuators of the steerable wheels.

Hence, steering is controlled solely by controlling the foremost wheels of the vehicle. This is advantageous as the desired longitudinal force on the vehicle can be maintained with minimal added propulsion. Also, less number of wheels may potentially be exposed to slipping, thus improving the stability during the turning maneuver.

According to an example embodiment, the steering system may be a secondary, redundant system able to steer the vehicle in addition to steering by means of a primary steering of the vehicle.

As described above, using the above described method for a secondary, redundant steering system enables for the vehicle to be sufficiently operated in case the primary steering system is not functioning as desired. Hence, no need of controlling the vehicle in a limp-home-mode or the like, since the vehicle can be controlled to function substantially as well as the primary steering system. There is also a reduced risk of crashing the vehicle in case the primary steering is malfunctioning. Hence, an improved safety is achieved.

According to a second aspect, there is provided a steering system of a vehicle, the vehicle comprising a front axle comprising a pair of front steerable wheels on a left and right hand side of the front axle, wherein each of the steerable wheels comprises an individually controllable wheel torque actuator; and a control unit connected to each of the wheel torque actuators, the control unit being configured to determine a required steering angle for operating the vehicle during a turning maneuver; detect an actual steering angle during the turning maneuver; determine a difference between the required steering angle and the detected, actual steering angle; determine, for the wheel torque actuators of the steerable wheels, a differential wheel torque required for reducing the difference between the required steering angle and the detected, actual steering angle; and control the wheel torque actuators to achieve the differential wheel torque of the steerable wheels.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Furthermore, the steering system may comprise, or be connected to, suitable sensors for e.g. detecting the actual steering angle during the turning maneuver, etc. Such sensor is preferably connected to the control unit for transmitting control signals thereto.

According to an example embodiment, the steering system may further comprise a path controller arranged to detect an upcoming path for the autonomous vehicle, the path controller being connected to the control unit.

The path controller may preferably comprise means for detecting the upcoming path. Such means may, for example, be a sensor, a camera, etc.

According to an example embodiment, the steering system may further comprise a wheel torque control module connected to the control unit and arranged to control operation of the individually controlled wheel torque actuators, wherein the wheel torque control module is arranged to control the wheel torque actuators to apply the differential wheel torque upon receiving a control signal from the control unit.

According to an example embodiment, the wheel torque control module may be a decentralized wheel torque control module arranged in connection to the wheel torque actuators of a respective steerable wheel. Hereby, the decentralized wheel torque control module is arranged in close connection to the respective wheel, whereby the torque can be applied relatively rapidly to the respective wheel.

According to an example embodiment, the wheel torque actuator may comprise a wheel brake. A wheel brake may thus be arranged to provide a brake pressure for opposing the rotational motion of the wheel and thus achieving the desired torque. The wheel brake may, for example, be a pneumatically controlled friction brake which is controlled by applying a brake pressure pneumatically. According to another example, the wheel brake may be an electromechanical friction brake or a hydraulically controlled friction brake. Alternatively or additionally, the wheel torque actuator may comprise an electric machine arranged to provide a positive torque.

According to an example embodiment, the steering system may be a secondary, redundant system, wherein the control unit is further arranged to receive a signal indicative of a primary steering system of the autonomous vehicle being unavailable; control the secondary, redundant system if the primary steering is unavailable. The secondary, redundant steering system may also be operated in addition to the primary steering system when the primary steering system is not functioning as desired, which is also described above in relation to the first aspect.

According to an example embodiment, the steering system may further comprise a wheel suspension system, wherein the steerable wheels are connected to the wheel suspension system with a positive scrub radius.

Further effects and features of the second aspect are largely analogous to those described above in relation to the first aspect.

According to a third aspect, there is provided a vehicle comprising a front axle comprising a pair of front steerable wheels on a left and right hand side of the front axle, wherein each of the steerable wheels comprises an individually controllable wheel torque actuator, and a steering system according to any one of the embodiments described above in relation to the second aspect.

According to an example embodiment, the vehicle may be an autonomous vehicle.

According to a fourth aspect, there is provided a computer program comprising program code means for performing the steps described above in relation to the first aspect when the program is run on a computer.

According to a fifth aspect, there is provided a computer readable medium carrying a computer program comprising program means for performing the steps described above in relation to the first aspect when the program means is run on a computer.

Effects and features of the third, fourth and fifth aspects are largely analogous to those described above in relation to the first and second aspects.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
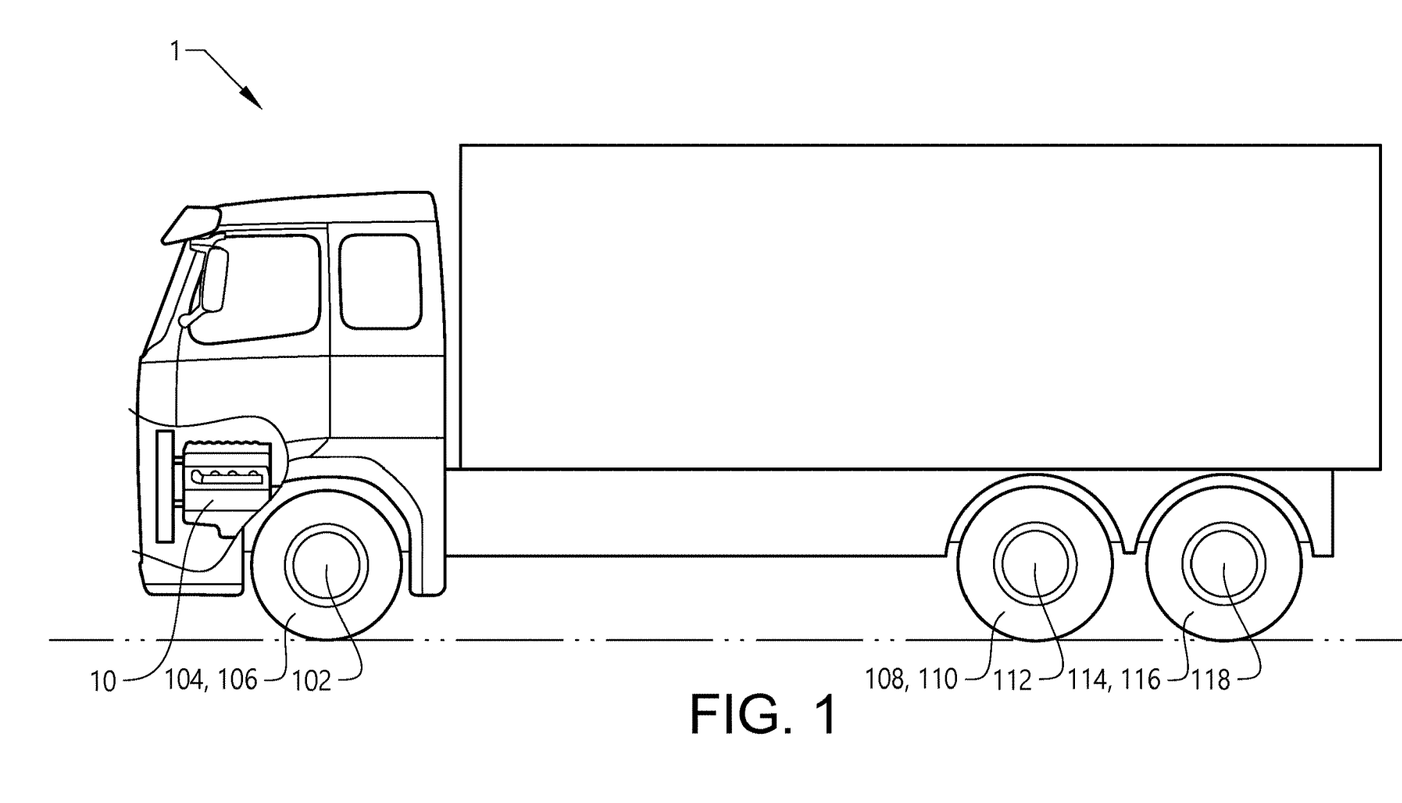
FIG. 1 is a lateral side view illustrating an example embodiment of a vehicle in the form of a truck.

With particular reference to FIG. 1, there is provided a vehicle 1 in the form of a truck. The vehicle 1 comprises a prime mover 2 in the form of an internal combustion engine, and a system (500, see e.g. FIG. 5) for controlling the steering of the vehicle. The vehicle 1 comprises a pair of steerable wheels 104, 106 arranged on a respective left and right hand side of a front axle 102 of the vehicle. The front axle 102 is thus the foremost located axle of the vehicle 1. The vehicle 1 depicted in FIG. 1 also comprises a pair of first rear wheels 108, 110 connected to a first rear axle 112, and a pair of second rear wheels 114, 116 connected to a second rear axle 118. The first rear axle 112 is arranged in front of the second rear axle 118 as seen in the longitudinal direction of the vehicle 1. Preferably, the pair of first rear wheels 108, 110 and the pair of second rear wheels 114, 116 are non-steerable wheels. It should be understood that the rear wheels may also be steerable during normal operation.

Figure 2:
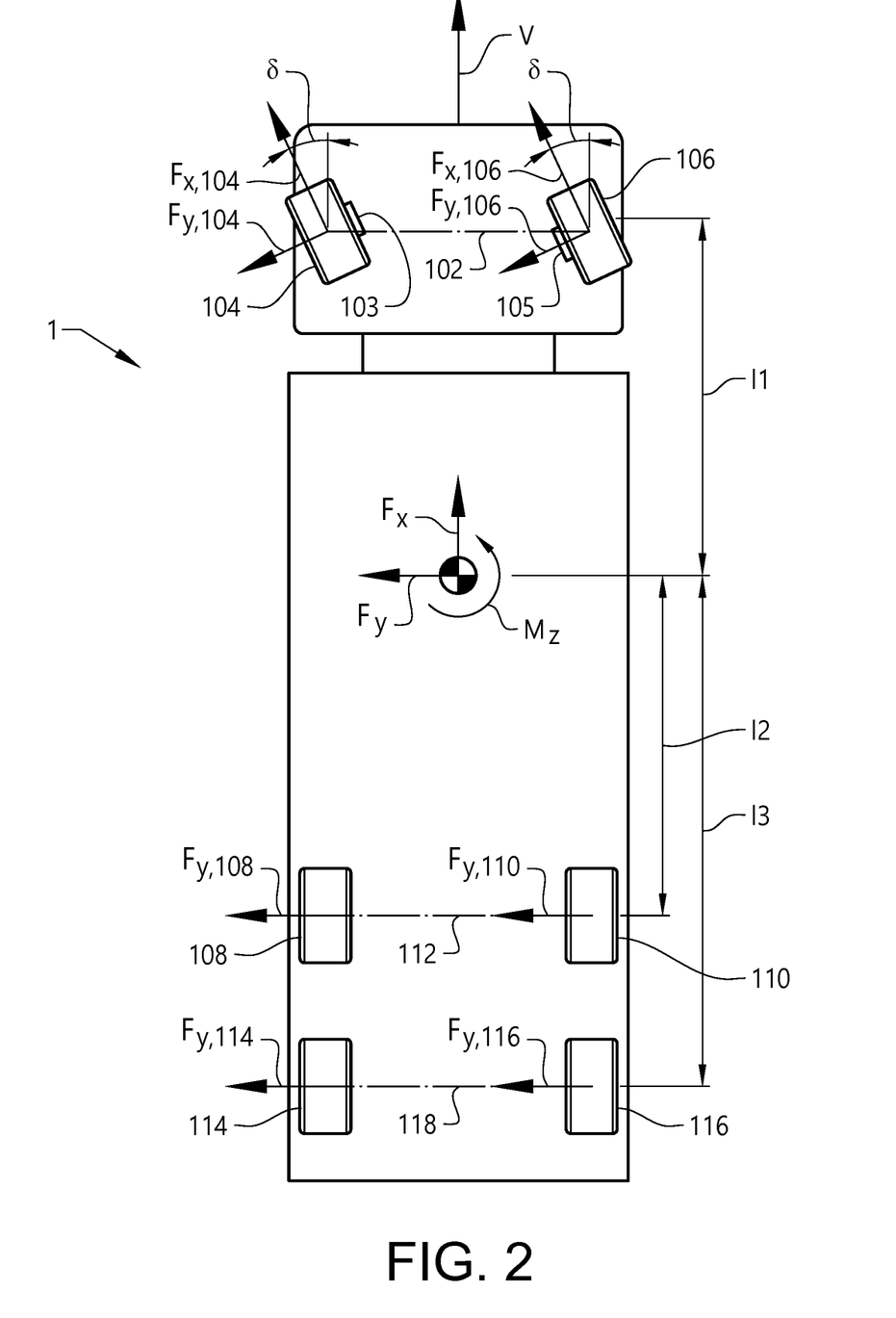
FIG. 2 is a schematic illustration from above depicting the vehicle in FIG. 1 exposed to a turning maneuver according to an example embodiment.
Figure 3:
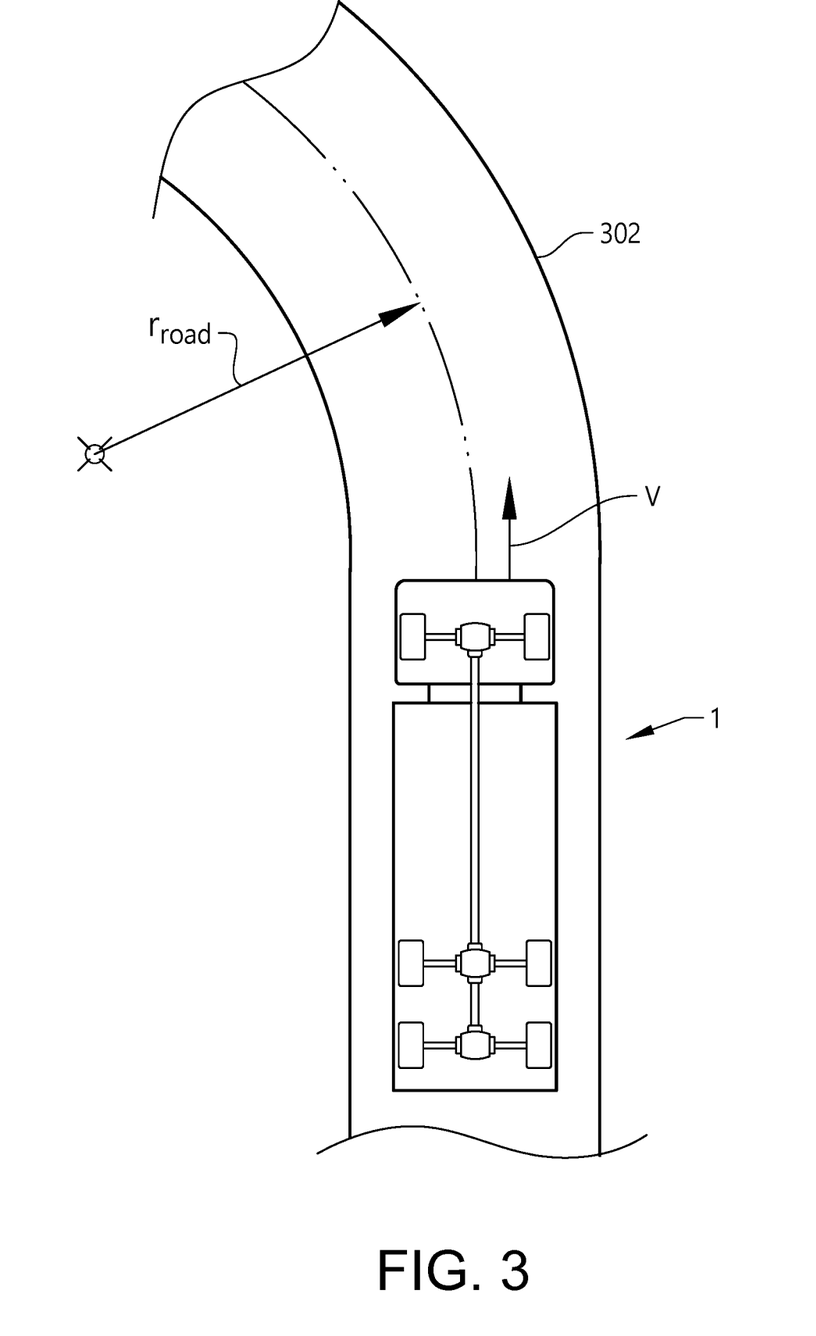
FIG. 3 illustrates the vehicle in FIG. 1 before entering a curvature of the road.

In order to describe the vehicle 1 in further detail, reference is made to FIGS. 2 and 3. In detail, FIG. 2 illustrates an example embodiment of the forces exposed to the vehicle 1 and its wheels during a turning maneuver, and FIG. 3 illustrates the vehicle 1 before initiating a turning maneuver, i.e. before arriving at a road curvature.

Starting with FIG. 2, which is a schematic illustration from above depicting the vehicle 1 in FIG. 1 exposed to a turning maneuver according to an example embodiment. Hence, the pair of steerable wheels 104, 106 is turning and being exposed to a steering angle δ. The steering angle δ is for simplification in FIG. 2 illustrated as the same for the left 104 steerable wheel and the right 106 steerable wheel and is an angle of the wheels relative to a longitudinal axis of the vehicle 1. The vehicle is operated at a vehicle speed indicated as v. The steerable wheels 104, 106 also comprise a respective wheel torque actuator 103, 105.

The vehicle 1 comprises, as described above, the pair of steerable wheels 104, 106 arranged on the front axle 102, the pair of first rear wheels 108, 110 connected to the first rear axle 112, and the pair of second rear wheels 114, 116 connected to the second rear axle 118. The front axle 102 is arranged at a distance $l_1$ from a center of mass 202 of the vehicle, the first rear axle 112 is arranged at a distance $l_2$ from the center of mass 202 of the vehicle, and the second rear axle 118 is arranged at a distance $l_3$ from the center of mass 202 of the vehicle. The center of mass 202 is the position of the vehicle 1 around which the vehicle rotates during the turning maneuver. The center of mass 202 is also the position of the vehicle 1 at which total global forces affecting the vehicle 1 can be expressed. In the following, the x-axis is the extending in the longitudinal direction of the vehicle 1, the y-axis is extending in the transversal direction of the vehicle 1 and the z-axis is extending in the vertical direction of the vehicle 1. During the turning maneuver, the vehicle 1 is exposed to a torque $M_z$ at the center of mass 202. Also, the vehicle is exposed to a global longitudinal force $F_x$ and a global lateral force $F_y$.

Moreover, when the steerable wheels 104, 106 of the front axle 102 is exposed to the steering angle δ, the steerable wheel 104 on the left hand side is exposed to a longitudinal force $F_{x,\ 104}$ and a lateral force $F_{y,\ 104}$, while the steerable wheel 106 on the right hand side is exposed to a longitudinal force $F_{x,\ 106}$ and a lateral force $F_{y,\ 106}$. The sum of the lateral force of the steerable wheels 104, 106 on the left and right hand sides can be expressed as a front wheel lateral force. The sum of the front wheel longitudinal forces may be increased/reduced when e.g. propelling the vehicle or braking the vehicle, whereas the differential front wheel forces is used for controlling the steering angle.

Furthermore, the pair of first rear wheels 108, 110 is exposed to a respective lateral force $F_{y,\ 108}$ and $F_{y,\ 110}$, and the pair of second rear wheels 114, 116 is exposed to a respective lateral force $F_{y,\ 114}$ and $F_{y,\ 116}$. In the example of FIG. 2, the longitudinal force of the pair of first rear wheels 108, 110 and the pair of second rear wheels 114, 116 is set to zero, i.e. the respective wheel is not exposed to propulsion or braking. This will be described further below.

Turning now to FIG. 3, which is an illustration of the vehicle before entering a curvature 302 of the road, i.e. before the turning maneuver takes place. As can be seen in FIG. 3, the vehicle 1 is currently driving straight ahead at the vehicle speed v. Thus, before entering the curvature 302, the steering angle δ is zero. The curvature has a radius denoted as $r_{road}$. Hereby, the vehicle may detect the curvature of the road ahead by means of a suitable sensor. According to an example embodiment, the vehicle may comprise a path controller (see FIG. 5) arranged to detect the road ahead, i.e. the upcoming turning maneuver. It should however be understood that the below described system and method may also be implemented during the turning maneuver, i.e. when the turning maneuver takes place. Also, the turning maneuver does not necessarily have to relate to a road curvature as depicted in FIG. 3. On the contrary, the turning maneuver may also relate to e.g. a lane change operation of the vehicle.

Figure 4A:
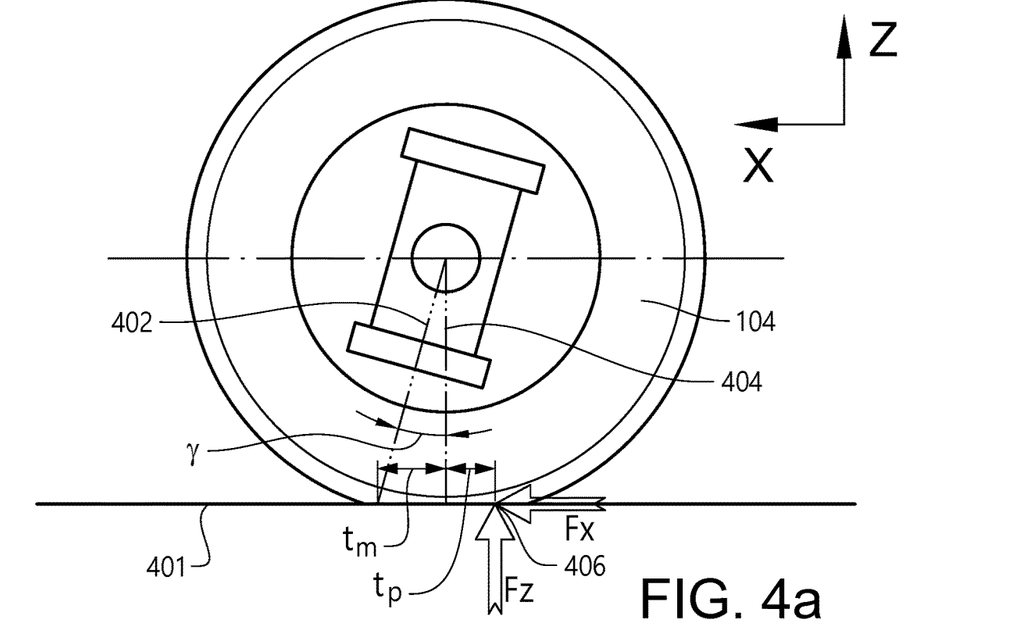
FIG. 4a-4c are different views illustrating one of the front steerable wheels according to an example embodiment.
Figure 4B:
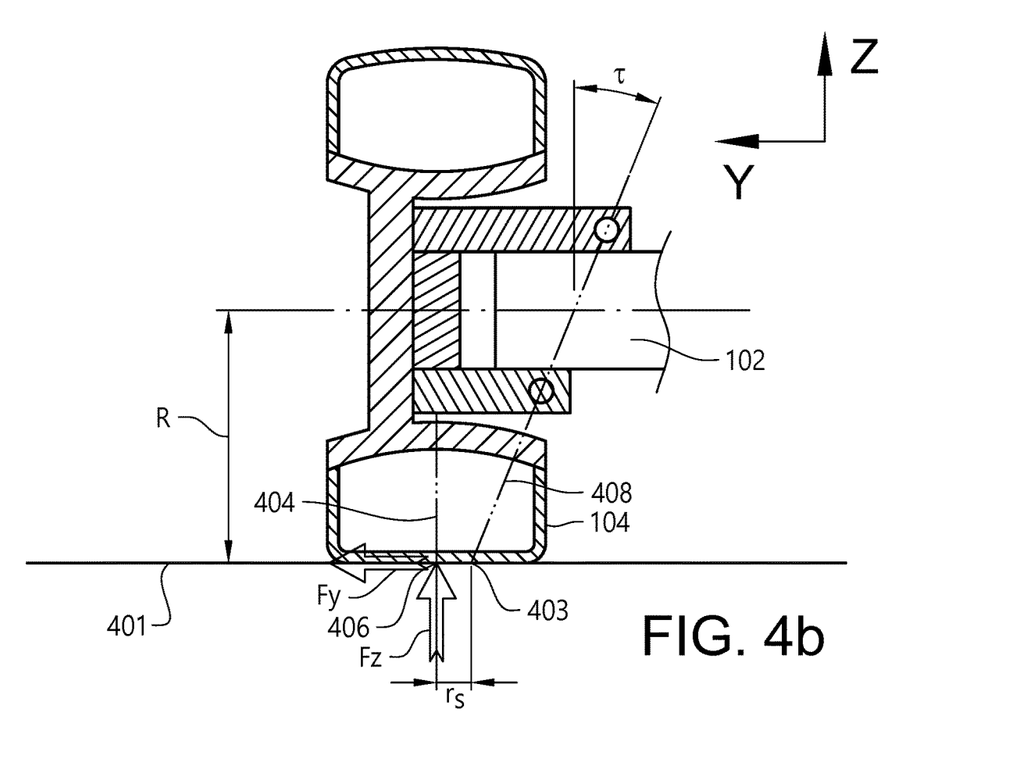
Figure 4C:
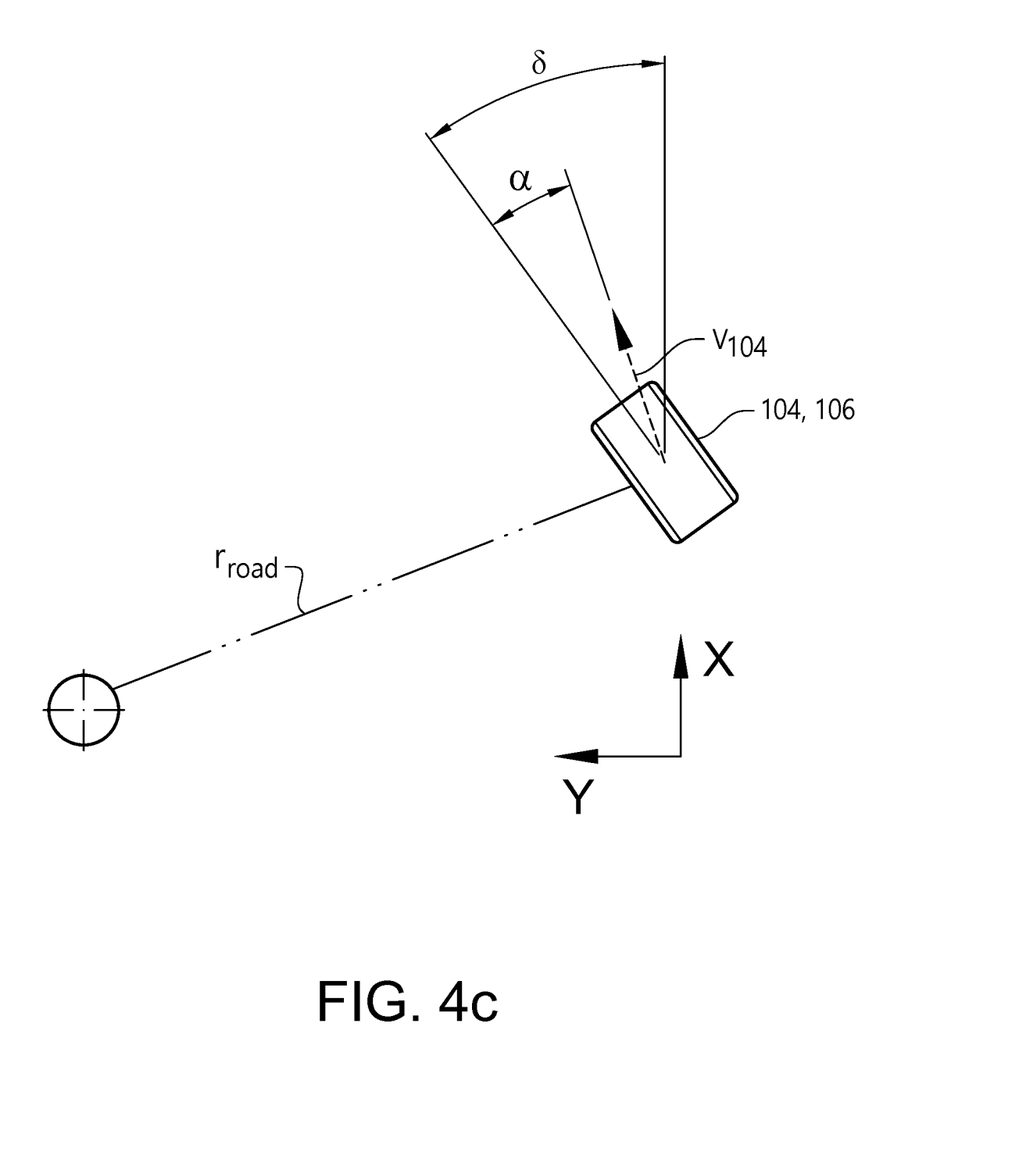

Turning now to FIGS. 4a-4c which illustrate different views of the left steerable wheel 104 according to an example embodiment. In detail, FIG. 4a is a side view of the left steerable wheel 104, FIG. 4b is a rear view of the left steerable wheel 104, and FIG. 4c is a top view of the left steerable wheel 104 during the turning maneuver.

Starting with FIG. 4a, which is a side view of the left steerable wheel 104. The suspension (not shown) of the wheel 104 is arranged such that the wheel 104 is provided with a suspension caster angle γ which is defined as the angular displacement of a steering axis 402 from a vertical axis 404 of the left steerable wheel 104, measured in the longitudinal direction of the vehicle 1. The distance between the intersection of the road surface 401 and the steering axis 402, and the intersection of the road surface 401 and the vertical axis 404 is denoted as $t_m$. With the suspension of the wheel, the point of force application of the contact patch 406 between the wheel 104 and the road surface 401 will be located slightly offset in the longitudinal direction from the intersection of the road surface 401 and the vertical axis 404. This offset is denoted as $t_p$. The contact patch is thus the area of the tire in contact with the ground surface. Thus, the point of force application of the contact patch 406 between the wheel 104 and the road surface 401 is dependent on the suspension caster angle γ.

Turning to FIG. 4b, which is a rear view of the left steerable wheel 104. As can be seen, the effective wheel radius R is indicated as the distance between the front axle 102 and the road surface 401, and the wheel 104 is connected to the suspension by an inclined king pin axis 408, which inclination is indicated as T. Thus, the wheel 104 is rotated around the king pin axis 408 during the turning maneuver. Furthermore, the point of force application of the contact patch 406 between the wheel 104 and the road surface 401 is located at the intersection between the vertical axis 404 and the road surface 401. The vehicle 1, and in particular the steerable wheels 104, 106 are provided with a positive wheel suspension scrub radius $r_s$. The wheel suspension scrub radius $r_s$ is defined as the distance between the point of force application of the contact patch 406 and the intersection 403 between the king pin axis 408 and the road surface 401. A positive wheel suspension scrub radius $r_s$ is generated when the intersection between the king pin axis 408 and the road surface 401 is located on an inner side of the vertical axis 404 as seen in the longitudinal direction depicted in FIG. 4b. When e.g. applying a brake torque on the left steerable wheel 104, the wheel will rotate around the king pin axis 408 due to the positive scrub radius $r_s$ causing the vehicle to turn to the left. Hereby, an additional steering torque $M_{steer}$ can be generated.

Turning to FIG. 4c, which is a simplified illustration of a combined left and right front wheel seen from above. In FIG. 4c, the steerable wheel is exposed to an increased wheel brake torque causing the vehicle to turn to the left. As can be seen, the vehicle 1 is operated at the road curvature described above in relation to FIG. 3, where the road curvature has the radius $r_{road}$. The steerable wheel 104 thus has a steering angle δ. However, the steerable wheel 104 will move at a speed v in the direction a relative to the steering angle δ. This angle α is referred to as a slip angle α.

By means of the above description, it is possible to control the motion of the vehicle by determining the required steering angle for operating the vehicle at the specific road curvature, and to compare such required steering angle with an actual steering angle. Parameters described above will not be given any further detailed description unless indicated. Hereby, the wheel torque of the steerable wheels 104, 106 can be added to reduce the difference between the required steering angle and the actual steering angle. The wheel torque can be determined by determining a required differential longitudinal force $\Delta F_x$, which is the difference between $F_{x,\,104}$ and $F_{x,\,106}$, and the wheel radius R.

The required additional steering torque $M_{steer}$ can be determined according to:

$$M_{steer} = \Delta F_x \cdot r_s = (F_{y,104} + F_{y,106}) \cdot t \quad (1)$$

where:
$F_{y,\,104}$ and $F_{y,\,106}$=the front wheel lateral force of the steerable wheels 104, 106 $t = t_m + t_p$ Equation (1) can be rewritten according to:

$$M_{steer} = -2C_\alpha \cdot \alpha \cdot (t_m + t_p) \quad (2)$$

where:

$$C_\alpha = \text{lateral stiffness of the tire;} \quad (3)$$

$F_{y,i} = C_\alpha \cdot \alpha$ = the front wheel lateral force; and $$\alpha = \left(\delta - \frac{l_1}{v}\omega\right)$$

where
v=the longitudinal vehicle speed; and
ω=rotational speed of the vehicle during the turning maneuver.

Furthermore, the global vehicle torque $M_z$ at the center of rotation 202 can be determined according to:

$$M_z = \quad (4)$$
$$l_1((F_{x,104} + F_{x,106}) \cdot \delta + 2C_\alpha \cdot \alpha) + \frac{w}{2}(-F_{x,104} + F_{x,106}) - 2C_\alpha \cdot l_2^2 \cdot \frac{\omega}{v} +$$
$$\frac{w}{2} \cdot (-F_{x,108} + F_{x,110}) - 2C_\alpha \cdot l_3^2 \cdot \frac{\omega}{v} + \frac{w}{2} \cdot (-F_{x,114} + F_{x,116})$$

where:
$\Delta F_x = F_{x,104} - F_{x,106}$
$F_{x,108} = F_{x,110} = F_{x,114} = F_{x,116} = 0$
$\beta = 0$
w=track width of the vehicle
where β is the side slip angle of the vehicle. Hereby, an assumption is made that the velocity is pointing in the same direction as the longitudinal axis of the vehicle.

Furthermore, the slip angle of the steerable wheels can be determined according to:

$$(F_{x,104} - F_{x,106}) \cdot r_s + (F_{y,104} + F_{y,106}) \cdot (t_m + t_p) = D\dot{\alpha} - J\ddot{\alpha} \quad (5)$$

$$F_y = F_{y,104} + F_{y,106} = C_\alpha \cdot \alpha \quad (6)$$

$$\Delta F_x \cdot r_s + 2C_\alpha \cdot \alpha \cdot (t_m + t_p) = D\dot{\alpha} - J\ddot{\alpha} \quad (7)$$

For a steady state operation: $\dot{\alpha} = \ddot{\alpha} = 0$:

$$\Delta F_x = \frac{2C_\alpha \cdot \alpha \cdot (t_m + t_p)}{r_s} \quad (8)$$

$$\alpha = \frac{\Delta F_x \cdot r_s}{2C_\alpha \cdot (t_m + t_p)} \quad (9)$$

Furthermore, with the assumption that $$r_{road} \approx \frac{v}{\omega} \text{ and } t = t_m - t_p,$$

the following expressions can be made:

$$0 = -\Delta F_x \cdot \left(\frac{l_1 \cdot r_s}{t} + \frac{\omega}{2}\right) - 2C_\alpha \cdot \alpha\left(\frac{1}{r_{road}} \cdot (l_2^2 + l_3^2)\right) \quad (10)$$

$$\Rightarrow \Delta F_x = 2C_\alpha \cdot \alpha \cdot \frac{-\frac{1}{r_{road}} \cdot (l_2^2 + l_3^2)}{\frac{l_1 \cdot r_s}{t} + \frac{\omega}{2}} \quad (11)$$

Hereby, the differential wheel torque of the steerable wheels can be determined based on the effective wheel radius R.

Figure 5:
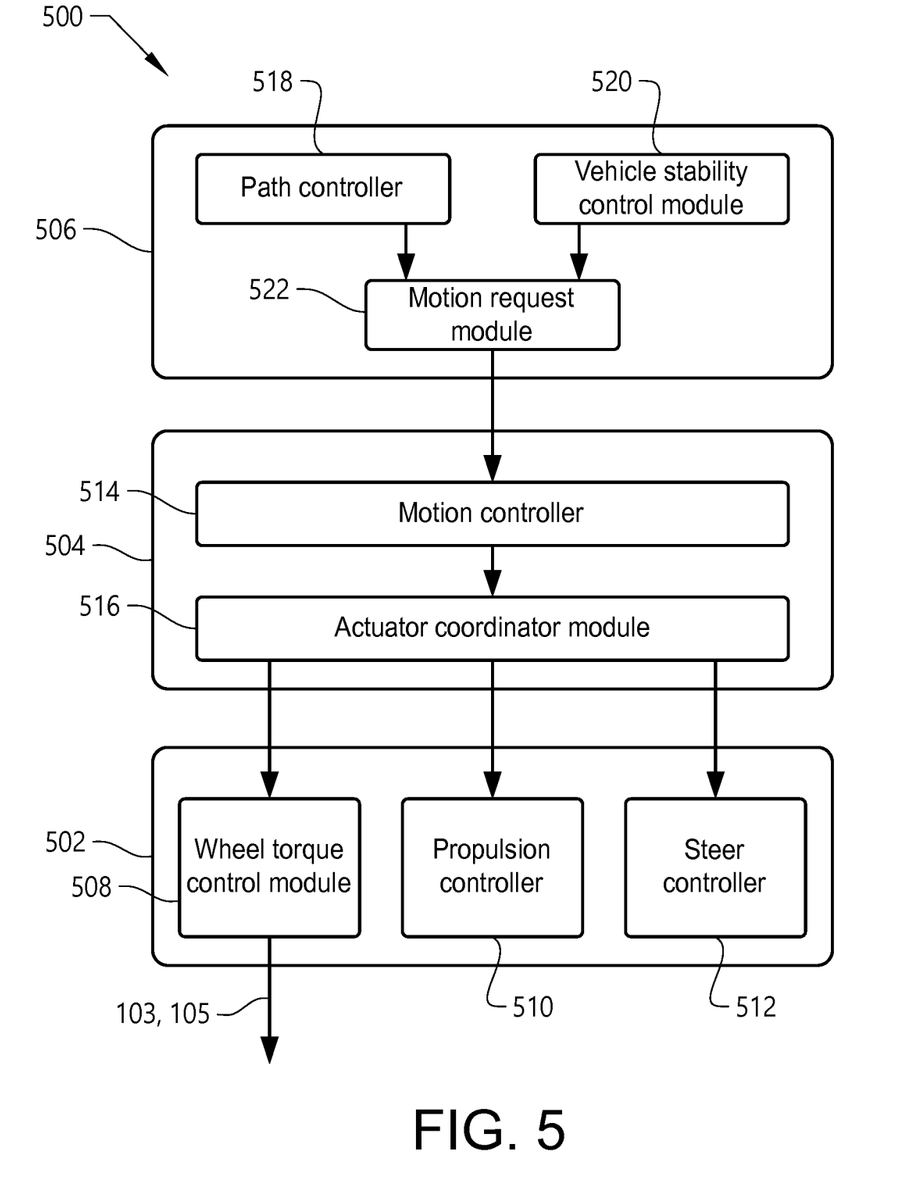
FIG. 5 is a schematic illustration of a steering system according to an example embodiment.

The above may be controlled by assigning control allocations, whereby the following expression can be formulated:

$$u_{opt} = \arg\min_{u_{min} \leq u \leq u_{min}} [\|W_u(u-u_d)\|_2^2 + \gamma\|W_v(Bu-v)\|_2^2] \quad (12)$$

where:

$$v = Bu \quad (13)$$

in which the following matrices and vectors are defined as $$\begin{bmatrix} F_x \\ F_y \\ M_z \\ M_{steer} \end{bmatrix} = \begin{bmatrix} \frac{1}{R} & \frac{1}{R} & \frac{1}{R} & \frac{1}{R} & \frac{1}{R} & \frac{1}{R} \\ 0 & 0 & 0 & 0 & 0 & 0 \\ -\frac{w_1}{2R} & \frac{w_1}{2R} & -\frac{w_2}{2R} & \frac{w_2}{2R} & -\frac{w_3}{2R} & \frac{w_3}{2R} \\ -\frac{r_s}{R} & \frac{r_s}{R} & 0 & 0 & 0 & 0 \end{bmatrix} \begin{bmatrix} T_{104} \\ T_{106} \\ T_{108} \\ T_{110} \\ T_{114} \\ T_{116} \end{bmatrix} \quad (14)$$

wherein:
R is the effective radius
T is the wheel torque for the respective wheel Reference is now made to FIG. 5, which illustrates the steering system 500 according to an example embodiment. As can be seen in FIG. 5, the steering system 500 comprises an actuator control module 502, a vehicle motion control module 504 and a traffic situation controller 506. The actuator control module 502 comprises a wheel torque control module 508, a propulsion controller 510 and a steer controller 512. The vehicle motion control module 504 comprises a motion controller 514 and an actuator coordinator module 516. Finally, the traffic situation controller 506 comprises a path controller 518, a vehicle stability control module 520 and a motion request module 522.

During operation of the exemplified system 500 in FIG. 5, the path controller 518 detects an upcoming path for the vehicle 1 and transmits a steering angle $\delta_{path}$ required to maintain the path to the motion request module 522. The signal is based on path curvature, and in some implementation on vehicle speed. Furthermore, the vehicle stability control module 520 transmits a maximum allowable rotational velocity for the vehicle at the upcoming path to the motion request module 522. The motion request module 522 evaluates the received signals and transmits a requested steering angle $\delta_{ref}$, a requested rotational velocity $\omega_{req}$, and a requested longitudinal vehicle acceleration $a_{x,\,req}$ to the motion controller 514.

The motion controller 514 evaluates the received parameters and transmits a vector comprising a longitudinal vehicle force $F_x$, lateral vehicle force $F_y$, global vehicle torque $M_z$, as well as the above described additional steering torque $M_{steer}$ to the actuator coordinator module 516.

Based on the received signal from the motion controller 514, the actuator coordinator module 516 transmits signals to one or more of the wheel torque control module 508, the propulsion controller 510 and the steer controller 512. In detail, the wheel torque control module 508 receives a signal indicative of a requested wheel torque, whereby the wheel torque control module 508 controls the individually controllable wheel torque actuator 103, 105 to apply the desired differential wheel torque. The propulsion controller 510 receives a signal indicative of a requested propulsion and control the vehicle to provide such propulsion. Finally, the steer controller 512 receives a signal indicative of a requested steer angle $\delta_{req}$. The steer controller 512 is thus mainly used in case the primary steering system is functioning as desired/intended. Each of the wheel torque control module 508, the propulsion controller 510 and the steer controller 512 can also transmit control signals back to the actuator coordinator module 516 for indicating e.g. the status of the respective parameters, etc.

Figure 6:
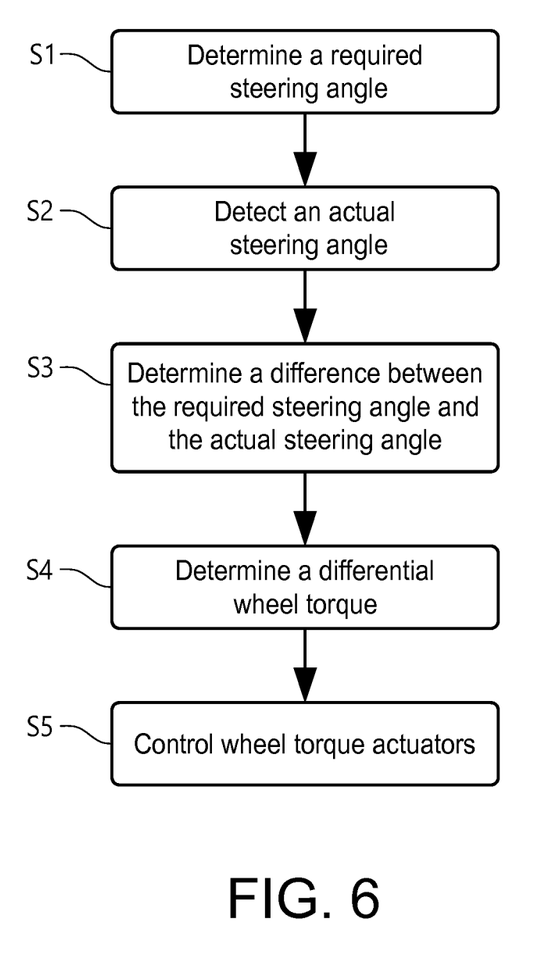
FIG. 6 is a flow chart of a method for controlling a steering system according to an example embodiment.

In order to sum up, reference is made to FIG. 6, which is a flow chart of a method for controlling the steering system according to an example embodiment. During operation, a required steering angle $\delta_{req}$ for operating the vehicle during a turning maneuver is detected S1. The required steering angle $\delta_{req}$ can be determined in advance based on a signal received from e.g. a path follower or from a an operator turning the steering wheel. An actual steering angle is thereafter detected S2 when operating the vehicle 1 during the turning maneuver. Hereby, a difference between the required steering angle and the detected, actual steering angle can be determined S3. By means of this determined difference, a differential wheel torque can be determined S4. The wheel torque actuators 103, 105 of the steerable wheels 104, 106 can then be controlled S5 for reducing such difference. The wheel torque actuators can be controlled to apply a differential braked force on the steerable wheels, or add a differential propulsion to the steerable wheel, depending on the type of wheel torque actuator used.

It is to be understood that the present invention is not limited to the embodiments described above and illustrated in the drawings; rather, the skilled person will recognize that many changes and modifications may be made within the scope of the appended claims.

The invention claimed is:

1. A method for controlling a steering system of a vehicle, said vehicle comprising a front axle comprising a pair of front steerable wheels on a left and right hand side of the front axle, wherein each of said steerable wheels comprises an individually controllable wheel torque actuator, said method comprising the steps of:
   determining a required steering angle for operating said vehicle during a turning maneuver;
   detecting an actual steering angle during the turning maneuver;
   determining a difference between the required steering angle and the detected, actual steering angle;
   determining, for the wheel torque actuators of the pair of front steerable wheels, a differential wheel torque required for reducing the difference between the required steering angle and the detected, actual steering angle, the differential wheel torque being determined by the steps of:
      determining a required additional steering torque of the pair of front steerable wheels for reducing the difference between the required steering angle and the detected, actual steering angle; and
      determining the differential wheel torque based on the required additional steering torque and a wheel suspension scrub radius of the steerable wheels; and
   controlling said wheel torque actuators for achieving said differential wheel torque of the steerable wheels.

2. The method of claim 1, further comprising the steps of:
   determining the turning maneuver by determining an upcoming path ahead of the vehicle; and
   detecting the actual steering angle when the vehicle is operated at the path.

3. The method of claim 1, wherein the step of determining the differential wheel torque comprises the steps of:
   determining a front wheel lateral force exposed to the pair of front steerable wheels; and determining said differential wheel torque based on the front wheel lateral force.

4. The method of claim 3, wherein the step of determining the front wheel lateral force comprises the steps of:
   determining a slip angle of the pair of front steerable wheels for the turning maneuver; and
   determining the front wheel lateral force based on a cornering stiffness of the pair of front steerable wheels and the slip angle.

5. The method of claim 1, wherein the required additional steering torque is further based on a suspension caster angle of the pair of front steerable wheels.

6. The method of claim 1, further comprising the steps of:
   determining a desired longitudinal vehicle force of the vehicle during the turning maneuver;
   determining a change of the longitudinal vehicle force resulting from the applied differential wheel torque of the pair of front steerable wheels; and
   controlling the vehicle to add propulsion or braking for maintaining the desired longitudinal vehicle force.

7. The method of claim 1, wherein the vehicle further comprises at least one rear axle comprising a pair of rear non-steerable wheels on a left and right hand side of the rear axle, wherein each of said rear non-steerable wheels comprises a rear wheel torque actuator, wherein the method further comprises the step of:
   inhibiting the rear wheel torque actuator on the pair of rear non-steerable wheels from applying a wheel torque when operating the torque actuators of the front steerable wheels.

8. The method of claim 1, wherein the steering system is a secondary, redundant system able to steer the vehicle in addition to steering by means of a primary steering of the vehicle.

9. A steering system of a vehicle, said vehicle comprising a front axle comprising a pair of front steerable wheels on a left and right hand side of the front axle, wherein each of said steerable wheels comprises an individually controllable wheel torque actuator, and a control unit connected to each of the wheel torque actuators, the control unit being configured to:
   determine a required steering angle for operating said vehicle during a turning maneuver;
   detect an actual steering angle during the turning maneuver;
   determine a difference between the required steering angle and the detected, actual steering angle;
   determine, for the wheel torque actuators of the pair of front steerable wheels, a differential wheel torque required for reducing the difference between the required steering angle and the detected, actual steering angle, wherein the control unit is configured to determine the differential wheel torque by:
      determining a required additional steering torque of the pair of front steerable wheels for reducing the difference between the required steering angle and the detected, actual steering angle; and
      determining the differential wheel torque based on the required additional steering torque and a wheel suspension scrub radius of the pair of front steerable wheels; and
   control the wheel torque actuators to achieve the differential wheel torque of the pair of front steerable wheels.

10. The steering system of claim 9, wherein the steering system further comprises a path controller arranged to detect an upcoming path for the vehicle, the path controller being connected to the control unit.

11. The steering system of claim 9, wherein the steering system further comprises a wheel torque control module connected to the control unit and arranged to control operation of the individually controlled wheel torque actuators, wherein the wheel torque control module is arranged to control the wheel torque actuators to apply the differential wheel torque upon receiving a control signal from the control unit.

12. The steering system of claim 11, wherein the wheel torque control module is a decentralized wheel torque control module arranged in connection with the wheel torque actuators of a respective steerable wheel.

13. The steering system of claim 9, wherein the wheel torque actuator comprises a wheel brake.

14. The steering system of claim 9, wherein the steering system is a secondary, redundant system, wherein the control unit is further arranged to:
   receive a signal indicative of a primary steering system of the vehicle being unavailable; and
   control the secondary, redundant system if the primary steering is unavailable.

15. The steering system of claim 9, further comprising a wheel suspension system, wherein the pair of front steerable wheels is connected to the wheel suspension system with a positive scrub radius.

16. A vehicle comprising a front axle comprising a pair of front steerable wheels on a left and right hand side of the front axle, wherein each of said steerable wheels comprises an individually controllable wheel torque actuator, and a steering system, the steering system comprising a control unit connected to each of the wheel torque actuators, the control unit being configured to:
   determine a required steering angle for operating said vehicle during a turning maneuver;
   detect an actual steering angle during the turning maneuver;
   determine a difference between the required steering angle and the detected, actual steering angle;
   determine, for the wheel torque actuators of the steerable wheels, a differential wheel torque required for reducing the difference between the required steering angle and the detected, actual steering angle, wherein the control unit is configured to determine the differential wheel torque by:
      determining a required additional steering torque of the pair of front steerable wheels for reducing the difference between the required steering angle and the detected, actual steering angle; and
      determining the differential wheel torque based on the required additional steering torque and a wheel suspension scrub radius of the pair of front steerable wheels; and
   control the wheel torque actuators to achieve the differential wheel torque of the pair of front steerable wheels.

17. The vehicle according to claim 16, wherein the vehicle is an autonomous vehicle.

* * * * *